United States Patent [19]
Vreeken

[11] Patent Number: 5,857,503
[45] Date of Patent: Jan. 12, 1999

[54] APPARATUS AND METHOD FOR CHANGING FLUID IN A MOTOR VEHICLE

[75] Inventor: Percy P. Vreeken, Grosse Pointe Farms, Mich.

[73] Assignee: Transnav, Inc., New Baltimore, Mich.

[21] Appl. No.: 745,788

[22] Filed: Nov. 8, 1996

[51] Int. Cl.[6] ................................................. B67C 11/00
[52] U.S. Cl. ............................ 141/332; 141/1; 141/333; 141/340; 141/343; 141/98; 141/383; 141/86; 184/1.5; 184/106
[58] Field of Search ..................................... 141/331–333, 141/340–343, 98, 1, 383, 86; 184/1.5, 106

[56] References Cited

U.S. PATENT DOCUMENTS

| | | | |
|---|---|---|---|
| 3,196,982 | 7/1965 | Dinkelkamp | 184/1.5 |
| 3,329,231 | 7/1967 | Takenouchi | 184/106 |
| 3,809,175 | 5/1974 | Andrews | 184/106 |
| 4,084,655 | 4/1978 | Savron | 184/106 |
| 4,098,398 | 7/1978 | Meyers | 141/340 |
| 4,235,264 | 11/1980 | Rau et al. | 141/1 |
| 4,667,628 | 5/1987 | Lopez-Crevillen | 184/106 |
| 4,674,586 | 6/1987 | Siemonsma | 184/106 |
| 5,130,014 | 7/1992 | Volz | 184/106 |
| 5,320,145 | 6/1994 | Avino | 141/98 |
| 5,339,676 | 8/1994 | Johnson | 184/106 |
| 5,454,960 | 10/1995 | Newsom | 184/106 |
| 5,546,999 | 8/1996 | Parker | 141/98 |
| 5,566,781 | 10/1996 | Robert et al. | 184/1.5 |
| 5,655,624 | 8/1997 | Kelly, Jr. | 184/1.5 |

Primary Examiner—J. Casimer Jacyna
Attorney, Agent, or Firm—Harness, Dickey & Pierce, P.L.C.

[57] ABSTRACT

A fluid channeling device to facilitate the draining of fluid from a fluid reservoir in a motor vehicle. The device may be attached to the vehicle so that it remains generally fixed, or the device may be temporarily attached to the vehicle for use while changing the fluid in the vehicle. The device is generally positioned below or in proximity to where the drained fluid will originate so that the device collects and channels fluid flowing from the point of origin. The device also includes an elongated throat section so that a hose may be attached to the device to further facilitate channeling the drained fluid.

18 Claims, 4 Drawing Sheets

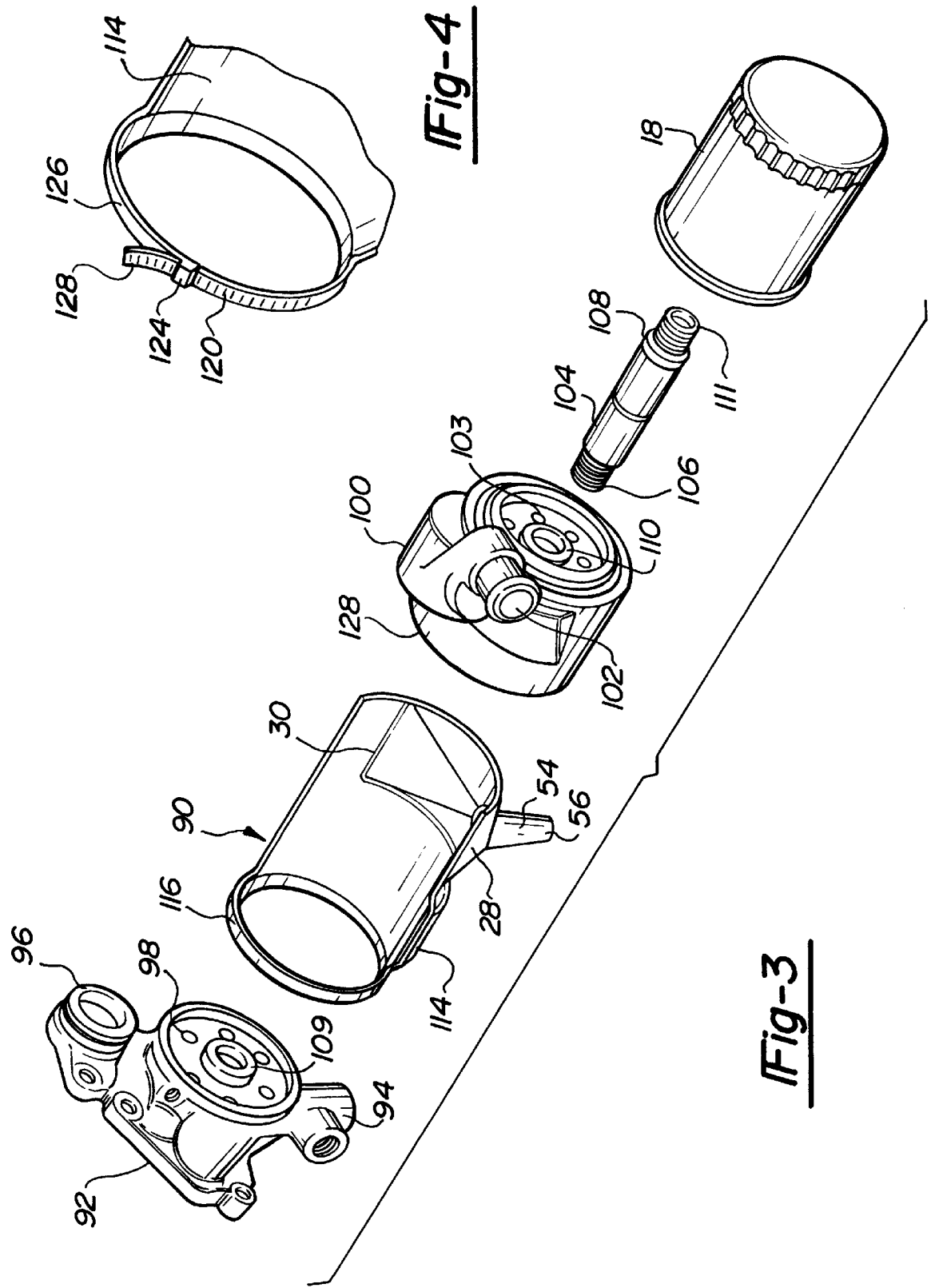

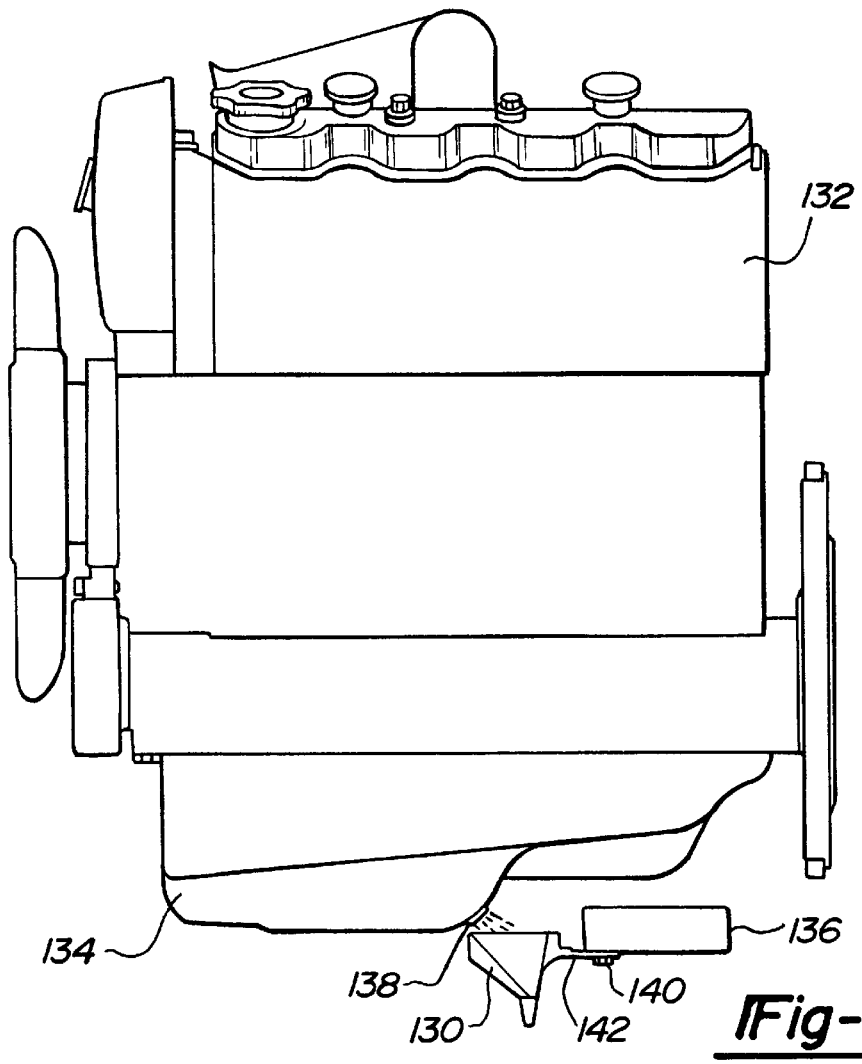
_Fig-5_
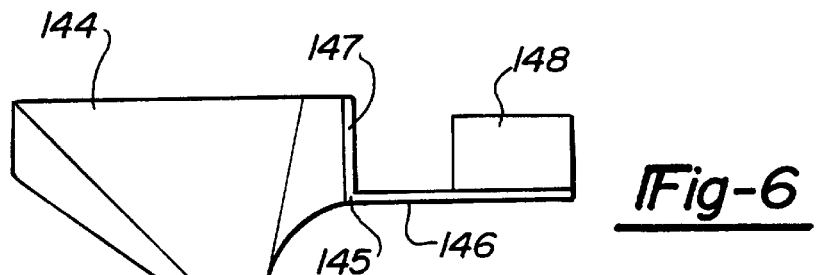
_Fig-6_
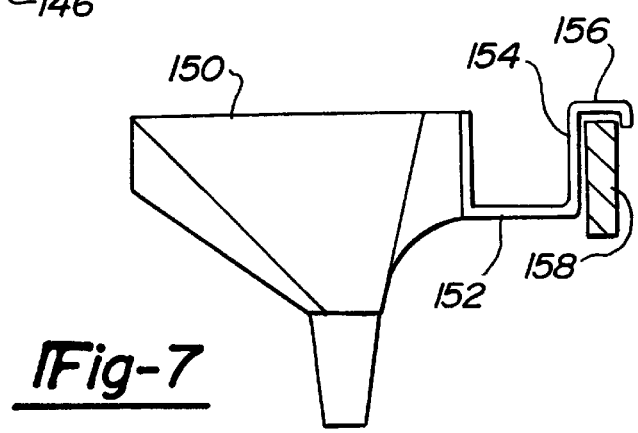
_Fig-7_

APPARATUS AND METHOD FOR CHANGING FLUID IN A MOTOR VEHICLE

TECHNICAL DESCRIPTION

This invention relates generally to an apparatus and method for facilitating changing fluid in a motor vehicle, and more particularly, to a fluid channeling device which channels fluid draining from fluid passages within a motor vehicle in order to prevent the fluid from spilling onto the ground and onto portions of the vehicle in proximity to the fluid passage.

BACKGROUND OF THE INVENTION

In a motor vehicle, there are several fluid reservoirs which contain fluids that support operation of the vehicle. For example, automobile engines include an engine lubrication system having an oil pan which functions as a reservoir for engine oil. Automobiles may also include other fluid reservoirs such as a transmission pan which is a reservoir for automatic (or manual) transmission fluid, a radiator which is a reservoir for engine coolant, and a rear axle which also stores fluid cooling system.

In addition to the lubrication, cooling, and transmission fluid reservoirs found in most automobiles, many vehicles other than automobiles have hydraulic systems. For example, a typical tractor, crane, or earth moving piece of equipment includes all of the above support systems and may also include a separate hydraulic system to operate various devices and attachments. Hydraulic systems require hydraulic fluid which is stored in a hydraulic fluid reservoir.

The maintenance schedule of most motor vehicles typically requires periodic replacement of one or all of the above-mentioned fluids for the vehicle to remain in optimum operating condition. Neglecting to remove and replace these fluids may lead to eventual failure of the engine or system in which the fluid is used. Probably the most common example of fluid replacement in a motor vehicle is changing of engine oil and the oil filter. Most manufacturers recommend that the engine oil and filter be removed and replaced with new engine oil and a new oil filter in approximately 3750 or 7500 mile intervals.

A standard oil and filter change involves raising the vehicle off the ground in order to provide a mechanic with access to the underside of the vehicle. The mechanic places a drain pan underneath the oil pan and removes a drain plug found in the bottom of the oil pan. This enables the oil to drain from the oil pan into the drain pan. Next, the operator then uses an oil filter wrench to unseat the oil filter and removes the oil filter by unscrewing it from the engine block. Because the oil filter often has residual oil the mechanic is careful to hold the filter with the open end of the filter facing upward in order to prevent the oil from spilling from the filter.

Despite the careful manipulation of the oil filter by the mechanic, residual oil in the engine lubrication system typically flows from the oil filter inlet and exhaust passages found in the engine block. Despite careful placement of the oil pan during removal of the filter, the mechanic is often unable to recover all fluid exiting the open inlet and exhaust passages of the engine block. Oil may drip down the side of the engine block, onto hoses, other parts of the engine, the vehicle frame or cross members, and vehicle wiring. This problem is exacerbated because present engine compartments are relatively compact and crowded, and many vehicle components interfere with direct access to the oil filter. Crowded engine compartments also worsen the problem of oil draining down the engine block and onto other components because the mechanic is often denied direct access to the oil filter inlet and outlet pipes. Further, because of the proliferation of while-you-wait oil change facilities, the engine block and surrounding components are often extremely hot during the oil change which imperils the mechanic attempting to reach up into the engine compartment to wipe away the residual oil flowing down the sides of the block and onto the components. The hot runoff oil could also drip onto the mechanic. These difficulties and safety hazards create a disincentive for the mechanic to attempt to perform a tidy engine oil change with a minimum of spillage.

The above difficulties with removing oil dripping onto the engine and vehicle components also create pollution problems. For example, when a vehicle owner changes the oil in his or her vehicle, the owner may place the car on a street or over a dirt covered area and neglect to clean up the unrecovered oil which has spilled onto the ground. This oil is eventually washed away by rain into the sewer system or eventually seeps into the ground, polluting the soil and the water table. Even a conscientious mechanic can fail to completely clean the oil spilled onto the engine block, hoses, and other surrounding components. This oil buildup may be washed away while driving through puddles or in rain storms, and this oil eventually finds its way to the sewer system or to the soil where it again may pollute the soil and water table. Unrecovered oil also harms the environment by reducing the amount of oil available for recycling. Many states require that oil recovered during oil changes be recycled. Oil which the mechanic fails to recover for recycling is not recycled and must be replaced by new supplies of oil.

Changing the oil of vehicles having compact engine compartments also creates a safety concern to the mechanic, particularly when the engine oil is changed soon after the vehicle has been operating so that the oil is very hot. The engine oil flowing from the drain pan when the drain plug is removed or from the engine block when the oil filter is removed often drips down the engine block or onto components in proximity to the drain hole or filter inlet or outlet. This oil may be redirected by the engine parts or other vehicle components on which the oil drips. This redirected oil, particularly when hot, may flow rather quickly to an area where it then runs off the vehicle and onto the mechanic, possibly severely burning the mechanic.

While the above conditions have been described with respect to removal and replacement of the engine oil and oil filter, similar problems may arise when replacing transmission fluid, coolant fluid, or transaxle fluid on a motor vehicle. The above conditions may also occur when performing maintenance on hydraulic systems for tractors and other earth moving equipment having hydraulic systems.

Thus, it is an object of the present invention to provide an apparatus and method which facilitates removal of fluids from a fluid reservoir or fluid bearing vessel in a vehicle.

It is a further object of the present invention to provide an environmentally safe apparatus and method for changing fluid in a vehicle in order to maximize the fluid recovered during the fluid change and minimize the fluid which drips onto vehicle components and onto the ground.

It is yet a further object of the present invention to provide an apparatus and method for changing fluid in a vehicle which is applicable to engine oil changes, oil filter changes, automatic transmission fluid changes, and radiator fluid changes, axle fluid changes, and hydraulic fluid changes, and the like.

It is yet a further object of the present invention to provide an apparatus which may be permanently affixed to the vehicle to recover fluid during a fluid change.

It is yet a further object of the present invention to provide an apparatus for changing fluid in a vehicle which may be temporarily attached to the vehicle during the fluid change and removed from the vehicle for use on other vehicles following the fluid change.

It is yet a further object of the present invention to provide a method for changing fluid in a vehicle which is environmentally safe and maximizes the fluid recovered during the fluid change.

It is yet a further object of the present invention to provide a method for changing fluid in a vehicle which minimizes fluid lost during the fluid change, thereby minimizing the fluid which contaminates the soil and water table.

SUMMARY OF THE INVENTION

In accordance with the teachings of the present invention, this invention is directed to a fluid channeling device for receiving fluid flowing from an outlet of a fluid bearing system on a vehicle. The fluid channeling device includes a mouth having an open, wide end and an open, narrow end, where the open wide end is positioned in proximity to the outlet of the fluid system. The open wide end collects fluid flowing from the fluid outlet. A throat has first and second open ends, where one of the first and second open ends connects to the open, narrow end of the mouth so that fluid passes from the mouth and through the throat. A member secures the fluid channeling device to the vehicle in proximity to the outlet.

Additional objects, features and advantages of the present invention will become apparent from the following description and the appended claims, taken in connection with the accompanying drawings.

BRIEF DESCRIPTION OF THE DRAWINGS

FIG. 3 is an exploded view of a third embodiment of the fluid channeling device in which the fluid channeling device is configured for use in an oil cooler;

FIG. 4 is a partial view of the embodiment of FIG. 2 showing an alternative manner of attaching the fluid channeling device to the vehicle;

FIG. 5 is a fourth embodiment of the fluid channeling device in which the fluid channeling device collects oil flowing from an engine oil drain pan;

FIG. 6 is a side view of the fluid channeling device having a magnet attached to a member extending from a portion of the fluid channeling device so that the magnet may be attached to a magnetically conductive element of the motor vehicle to temporarily attach the fluid channeling device to the motor vehicle;

FIG. 7 is a side view of the fluid channeling device having a hook attached to a member extending from a portion of the fluid channeling device so that the hook may be attached to a portion of the motor vehicle to temporarily attach the fluid channeling device to the motor vehicle;

DETAILED DESCRIPTION OF THE INVENTION

Figure 1:
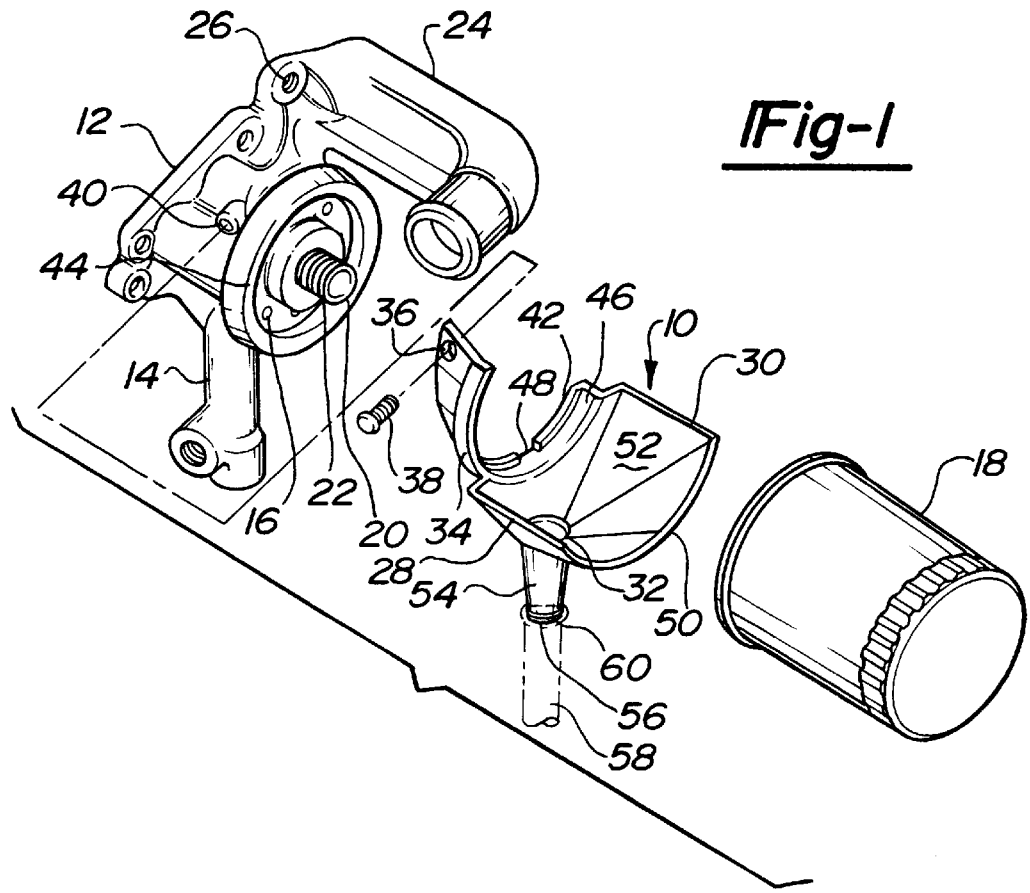
FIG. 1 is an exploded view of the fluid channeling device for a vehicle arranged in accordance with the principles of a first embodiment of the present invention in which the fluid channeling device is attached to the vehicle in a generally permanent installation.

With reference to FIG. 1, a first embodiment of the fluid channeling device 10 is shown. The fluid channeling device 10 attaches to an oil fluid manifold 12. Oil filter manifold 12 includes an inlet pipe 14 which receives oil under pressure from an oil pump (not shown). The oil under pressure flows through inlet passages 16 through the filter element (not shown) of oil filter 18. Oil passes through the filter element and exists oil filter 18 through a center outlet pipe (not shown) and reenters the oil filter manifold 12 through connecting pipe 20. The oil filter 18 is threaded onto connecting pipe 20 via threads 22. Oil exits the oil filter manifold 12 through outlet pipe 24 and is distributed throughout the engine. The oil filter manifold 12 is connected to an engine block (not shown) by threaded fasteners (not shown) threaded through holes 26 formed in the oil filter manifold 12.

In a first embodiment of the present invention, the fluid channeling device 10 includes a mouth 28 having an open, wide end 30 and an open narrow end 32. The mouth 28 is generally an inverted, conically shaped vessel with open ends. On one side of fluid channeling device 10, an annular member 34 extends from one side of the mouth 28. The annular member 34 includes an aperture 36 through which passes a threaded fastener 38. Threaded fastener 38 engages a threaded bore 40 and is secured to the oil filter manifold 12 by the threaded fastener 38. The annular member 34 includes a lip 42 which seats behind an outer ring 44 of the oil filter manifold 12. The lip 42 also defines a groove 46 which is formed to engage outer ring 44 of oil filter manifold 12. The lip 42 also includes a cutout 48 which cooperates with a key (not shown) formed opposite the oil filter 18 from the outer ring 44. The key cooperates with the cutout 48 to ensure proper orientation of fluid channeling device 10. Opposite the annular member 34 and groove 46, fluid channeling device 10 includes an annular side wall 50 which is formed to enable oil filter 18 to threadably engage connecting pipe 20 without interference from fluid channeling device 10.

The mouth 28 also includes an inner surface 52 which forms a partial, funnel-like shape so that the collected fluid drains in the general direction of the open, narrow end 32. The open, narrow end 32 attaches to a throat 54 that defines a generally open passage which enables fluid to flow from open, narrow end 32 through the open end 56 of throat 54. Optionally, a hose 58 (shown in phantom) may connect at the lower end 56 of throat 54. Throat 54 may also include one or a plurality of ridges 60 to enable a better connection between the hose 58 and throat 54.

Figure 2:
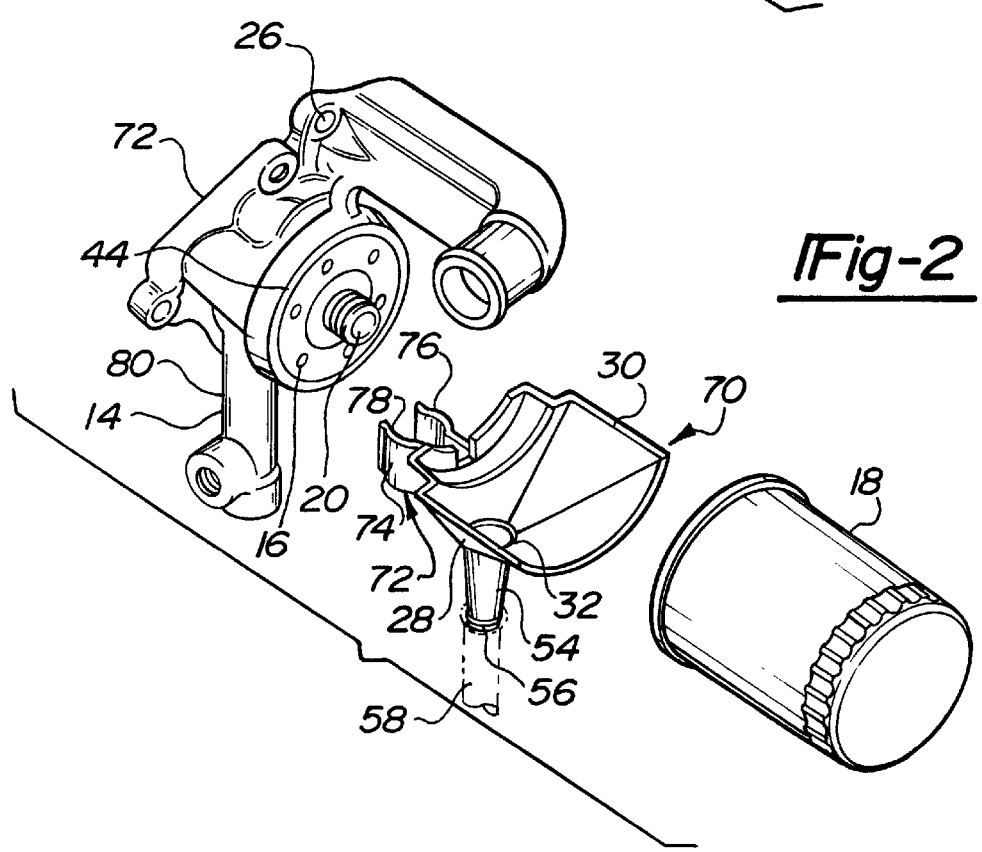
FIG. 2. is an exploded view of a second embodiment of the fluid channeling device in which the fluid channeling device may be temporarily positioned during the fluid change.

FIG. 2 shows a second embodiment of the fluid channeling device 70. Fluid channeling device 70 is arranged similarly to fluid channeling device 10, but fluid channeling device 70 is configured to facilitate attachment and detachment from the vehicle for temporary usage. Note that throughout the specification, like elements will be referred to in the figures using like referenced numerals. Accordingly, FIG. 2 shows an oil filter manifold 72 having an inlet pipe 14 and an outlet pipe 24. Fluid flows through the inlet pipe 14 and into the oil filter 18 via a plurality of inlet passages 16 and exits through connecting pipe 20. The oil filter manifold 12 is attached to the engine block via a plurality of fasteners (not shown) inserted through holes 26. One skilled in the art will recognize that the oil filter manifold 12 may optionally be integrally formed with the engine block rather than formed as a separate part and attached to the engine block.

Fluid channeling device 70 is formed similarly to fluid channeling device 10 of FIG. 1. Fluid channeling device 70 has a generally funnel-like shaped mouth 28 having an open, wide end 30 and an open, narrow end 32. Mouth 28 is designed to collect fluid which may flow from inlet passages 16 and connecting pipe 20 upon removal of an oil filter 18. The collected fluid flows through the narrow end 32 of mouth 28 and into throat 54. Fluid flowing through throat 54 flows through a generally open end 56. Optionally, a hose 58 may be installed around the open end 56 and enable further channeling of fluid collected by fluid channeling device 70.

The fluid channeling device 70 is designed generally for temporary installation so that a mechanic may install and remove the fluid channeling device 70 relatively easily. Rather than a fixed, threaded installation, fluid channeling device 70 is positioned underneath the outer ring 44 by positioning clamp 72 so that the open end 78 receives the neck 80 of the fluid inlet pipe 14. Accurately formed jaws 74 and 76 substantially encircle the neck 80 and provide a sufficient interference fit to maintain fluid channeling device 70 in the installed position. Fluid channeling device 70, similarly to fluid channeling device 10 of FIG. 1, includes a groove 46 which facilitates positioning of fluid channeling device 70. Also, a cutout 48 receives a key (not shown) formed in oil filter manifold 12 to enable circumferential orientation of fluid channeling device 70.

In operation, fluid channeling device 70 may be installed prior to removing the oil filter 18. Fluid channeling device 70 collects fluid draining from inlet passages 16 and connecting pipe 20. The collected fluid flows through open, narrow end 32 and throat 54 and through hose 58, if installed. The fluid is channeled into a drip pan or other fluid channeling device. Thus, fluid channeling device 70 prevents fluid from running down the engine block and onto hoses, wires, and other engine components. Following installation of an oil filter 18, fluid channeling device 70 may be removed by the mechanic. The mechanic merely pulls fluid channeling device 70 away from neck 80 of oil filter manifold 12. This disengages the jaws 74 and 76 from the neck 80 so that fluid channeling device may be removed and used in future oil changes on similar or different vehicles.

FIG. 3 is a fluid channeling device 90 arranged in accordance with the principles of a third embodiment of the present invention. Fluid channeling device 90 is arranged for operation in a permanent installation for use in a lubrication system having an oil cooler. An oil filter manifold 92 includes an oil intake pipe 94 and an oil outlet pipe 96. The oil filter manifold 92 also includes inlet passages 98 and an outlet passage 109. Inlet passages 98 introduce oil to oil cooler 100, and outlet passage 109 provides an exit passage for oil flowing from oil cooler 100.

The oil cooler 100 is a generally cylindrically shaped device having hollow passages through which engine oil may pass. The oil cooler also includes a coolant inlet 102 for receiving coolant from the engine coolant system. The coolant circulates in passages (not shown) of the oil cooler 100 and exits through a coolant exhaust passage (not shown). The oil cooler 100 also has separate inlets 103 to allow engine oil to flow through so that heat may be conducted from the engine oil to the coolant flowing through the oil cooler 100. The oil cooler 100 is attached to the oil filter manifold 92 via a connecting pipe 104. Connecting pipe 104 has threads 106 which engage an interior threaded section of fluid outlet 109 of oil filter manifold 92. At the other end of connecting pipe 104, a shoulder 108 engages a cylindrical passage 110 through oil cooler 100. An oil filter 18 engages threads 112 of connecting pipe 104.

Prior to assembling the oil cooler 100 to the oil filter manifold 92, fluid channeling device 90 is inserted between the oil filter manifold 92 and oil cooler 100. Fluid channeling device 90 is arranged similarly to that described in FIGS. 1 and 2, but also includes an elongated section 114 to accommodate oil cooler 100. Fluid channeling device 90 includes a fastening ring 116 at one end. The fastening ring 116 is securely fastened to the oil filter manifold 92 by a side surface 119 of oil cooler 100. Fastening ring 116 attaches to elongated section 114 which connects to mouth 28 of fluid channeling device 90. Mouth 28 has an open, wide end 30 and an open, narrow end 32. A throat 54 connects to the open, narrow end 32 of mouth 28. A hose (not shown) may be attached to the open end 56 of throat 54 to further channel fluid flowing through collection device 90, as described with respect to FIGS. 1 and 2.

In operation, oil flows into the oil filter 18 via a plurality of inlet passages 98 formed in oil filter manifold 92 and through fluid inlets 103 formed in oil cooler 100. Oil cooler 100 cools the fluid as it passes through oil cooler 100 into oil filter 18 via fluid inlets 103. The fluid passes through the filter element (not shown) in oil filter 18 and then passes through connecting pipe 104 and fluid outlet 109. Elongated section 114 enables a fixed attachment of fluid channeling device 90 to oil filter manifold 92. Elongated section 114 enables the mouth 28 of fluid channeling device 90 to be placed below the fluid inlets 103 and outlet 111 so that when the oil filter 18 is removed, fluid flowing from the inlet 103 and outlet 111 flows into the mouth 28 of fluid channeling device 90. Fastening ring 116 may be formed integrally in fluid channeling device 90 during the manufacturing process. Fastening ring 116 may be formed of the same material as fluid channeling device 90 or, alternatively, may be formed of a steel material.

FIG. 4 shows an alternative embodiment of fluid channeling device 90 of FIG. 3. In this embodiment, fastening ring 126 is an open, cylindrical band. One end 118 has serrations 120 formed thereon. The end 118 passes through a lock mechanism 124 which engages the serrations 120 of the end 118. By forming a plurality of serrations 120 on the end 118 and varying the engagement of the end 118 with the lock mechanism 122, fluid channeling device 90 may be either temporarily or permanently installed on oil filter manifold 92 for use during oil filter changes. In addition, the configuration of FIG. 4 enables fluid channeling device 90 to be attached to oil filter manifolds of varying sizes and shapes.

FIG. 5 depicts a fourth, embodiment of fluid channeling device 130. Fluid channeling device 130 enables collection of fluid draining from an oil pan. FIG. 5 shows a side view of an engine 132 having a lubrication system including an oil pan 134. Because modern engine compartments are becoming progressively more compact, the engine is often supported on or placed in proximity to a cross member 136.

When the drain plug (not shown) is removed, oil flows out of the drain hole 138 of oil pan 134. When the oil plug (not shown) is first removed, the oil stream flowing from drain hole 138 may project onto cross member 136. This results in the oil spreading along cross member 136. When this occurs, oil may not be entirely collected into the drip pan and may drip onto the ground or may collect in channels formed in cross member 136. This oil may be later washed away during storms or when driving through puddles. Fluid channeling device 130 is placed in proximity to drain hole 138 so that fluid flowing from drain hole 138 flows into fluid channeling device 130. Fluid channeling device 130 may be attached in any of a number of locations depending upon the particular vehicle configuration. For example, fluid channeling device 130 of FIG. 5 includes a support member 142 for attachment to any one of oil pan 134, cross member 136, or any of a number of components of engine 132. As shown in FIG. 5, fluid channeling device 130 attaches to cross member 136 via support member 142. Support member 142 is secured to cross member 136 using a threaded fastener 140.

FIGS. 6–7 demonstrates example manners of attachment of a fluid channeling device to a vehicle. FIG. 6 depicts a fluid channeling device 144 having a support member 146. The support member 146 attaches at one end 145 to the main portion 147 of fluid channeling device 144. At the other end, a magnet 148 is attached to the support member 146. The magnet 148 enables attachment of fluid channeling device 144 by placing the magnet in proximity to any magnetically conductive material, such as steel or iron.

FIG. 7 shows a fluid channeling device 150 having a support member 152 attached to the fluid device 150. The support member 152 attaches at one end to fluid channeling device 150. At the other end, the support member 152 attaches to a hanger 154. The hanger includes a hook portion 156 which can hook onto any of a number of engine components, such as cross member 158. Preferably the hook portion 156 is flexible so that the hook portion 156 can be formed to provide a more stable attachment to the vehicle.

Figure 8:
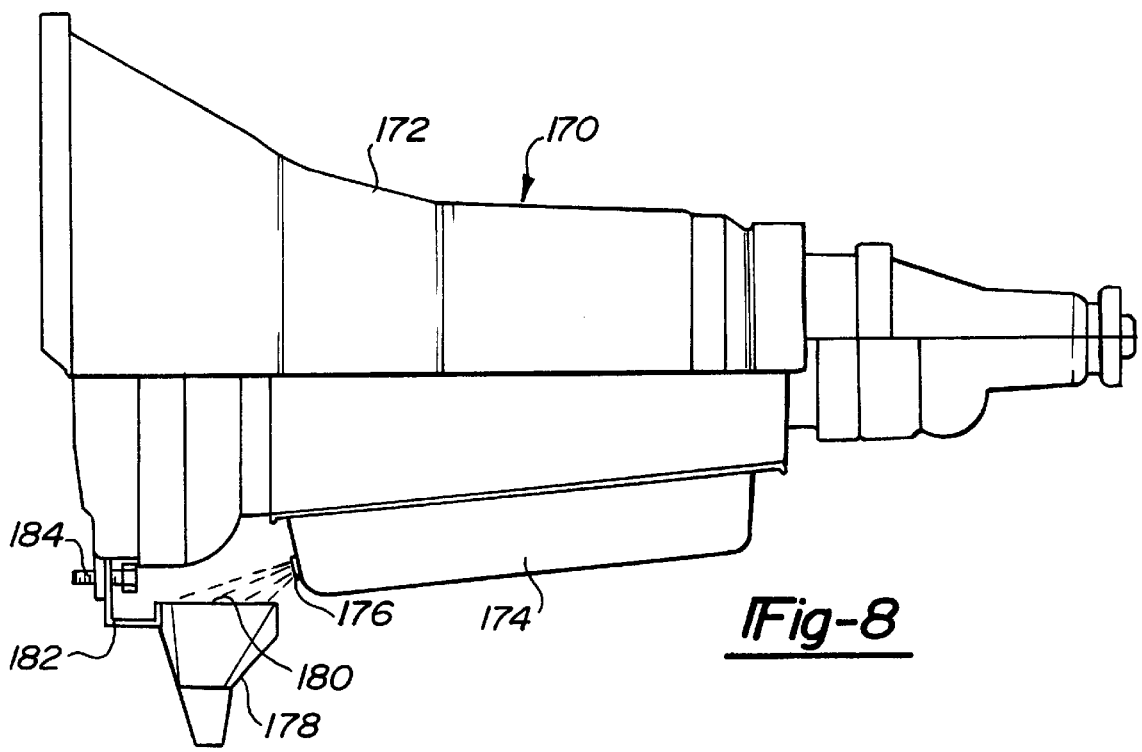
FIG. 8 is yet another embodiment of the fluid channeling device in which the fluid channeling device is positioned to collect automatic transmission fluid draining from an automatic transmission fluid pan or reservoir.

FIG. 8 shows fluid channeling device in accordance with yet another embodiment of the present invention. A transmission 170 has a housing 172 and a transmission pan 174. The transmission pan 174 provides a fluid reservoir for transmission fluid used by the transmission 170. The transmission pan 174 includes a drain hole 176 though which transmission fluid may be drained. In some vehicles it may be desirable to use a fluid channeling device as described above to collect transmission fluid in order to provide an environmentally safe and neat method of collecting transmission fluid. Fluid channeling device 178 is shown positioned in proximity to drain hole 176 so that transmission fluid flows from drain hole 176 into the open, wide end 180 of fluid channeling device 178. An attachment member 182 extends from fluid channeling device 178 and is shown fashioned to the transmission housing 172 via a threaded fastener 184. It will be understood by one skilled in the art any of the above-discussed configurations for attaching fluid channeling device 178 described herein may substitute for using a threaded fastener 184. For example, fluid channeling device 144 of FIG. 6 may also be used to attach fluid channeling device 178 in position for use in draining a transmission 170.

Figure 9:
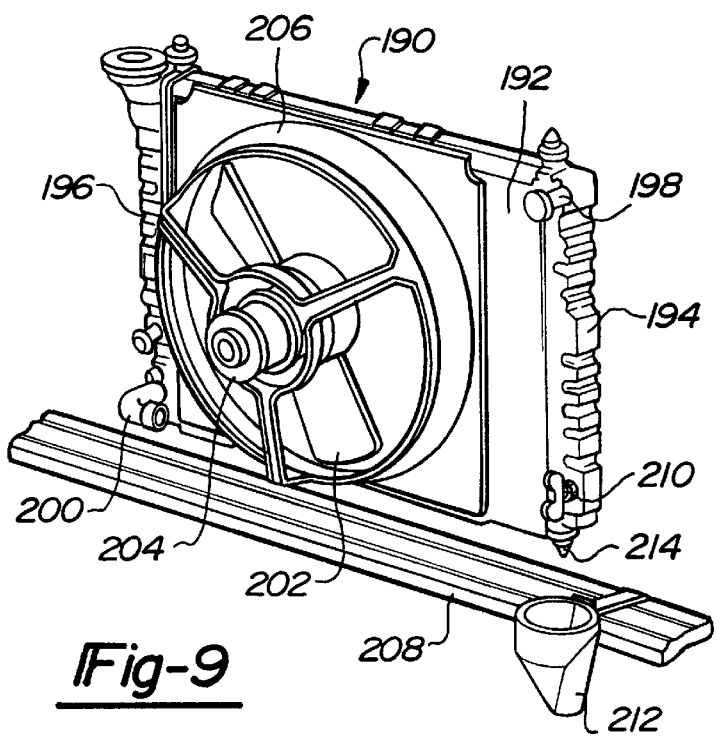
FIG. 9 is a perspective view of yet another embodiment of the fluid channeling device in which the fluid channeling device is positioned to collect coolant drained from a radiator of a vehicle.

FIG. 9 depicts yet another embodiment of the fluid collection system. FIG. 9 shows a radiator system 190 having a core 192, an inlet tank 194, an outlet tank 196. Typically, water flows into the inlet 198 of inlet tank 194 and flows across the radiator core 192 where it is cooled and exits outlet pipe 200 of outlet tank 196. The radiator system 190 may also include a fan 202 which is operated by a motor 204 and protected by shroud 206. The radiator system 190 is typically mounted on a cross member 208 and held in place by fasteners (not shown). The inlet tank 194 and outlet tank 196 may include pegs or posts 214 received by locator holes (not shown) formed in cross member 208 so that cross member 208 provides support for the radiator system 190. Inlet tank 194 also includes a drain cock 210. Drain cock 210 typically remains in the closed position in order to prevent water from draining from the radiator 190. In order to drain the radiator 190, drain cock 210 is opened so that water may flow from drain cock 210.

In order to provide an environmentally safe method of collecting fluid draining from radiator 190, a fluid channeling device 212 may be placed in proximity to drain cock 210 to collect fluid flowing therefrom. Fluid channeling device 212 may assume any of the configurations described above which facilitate use of the fluid channeling device 212. The fluid channeling device 212 provides an environmentally safe approach to preventing coolant from draining onto the ground beneath the vehicle and entering the water or ground systems.

From the foregoing, it can be seen that the fluid channeling device described provides an environmentally safe and efficient method for changing fluids in a vehicle. The drained fluid thus flows into fluid channeling device which facilitates the channeling of the drained fluid into a drip pan or other collection vessel, rather than having the drained fluid spill into the environment. Further, it will be understood by one skilled in the art that the foregoing may be equally applicable to any motor vehicle having a fluid systems require periodic draining and replacement of fluids. Such systems may include lubrication, cooling, transmission, hydraulic, rear axle, and differential systems.

While the above detailed description describes the preferred embodiment of the present invention, it should be understood that the present invention is susceptible to modification, variation and alteration without deviating from the scope and fair meaning of the subjoined claims.

What is claimed is:

1. A fluid channeling device for receiving fluid draining from a fluid bearing system on a vehicle, comprising:

a mouth formed in a shape of a generally closed surface having an open, wide end and an open, narrow end, the open wide end being positioned in proximity to at least one of an inlet and an outlet of the fluid system, wherein the at least one of the inlet and outlet enable fluid flow through a fluid filter, and the mouth includes a side wall adapted to curve about a portion of the filter to enable connection of the filter to the vehicle and said wide end is adapted to extend outwardly from the vehicle along the length of the filter;

a throat having first and second open ends, one of the first and second open ends connecting to the open, narrow end of the mouth so that fluid passes from the mouth and through the throat; and attachment means for securing the fluid channeling device to the vehicle in proximity to the at least one of the inlet and outlet.

2. The fluid channeling device of claim 1 wherein the fluid bearing system is one of the group of a lubrication system, a transmission fluid system, a cooling system, a hydraulic system, and an axle system.

3. The fluid channeling device of claim 1 wherein the attachment means further, comprises:

an aperture formed in the attachment means; and a fastener inserted through the aperture to attach to a portion of the vehicle to secure the fluid channeling device to the vehicle.

4. The fluid channeling device of claim 3 wherein the fastener further comprises a threaded fastener.

5. The fluid channeling device of claim 1 wherein the attachment means further comprises a magnetic element integrally formed with the fluid channeling device, and the magnetic element is placed in proximity to a magnetically conductive member of the vehicle to attach the fluid channeling device to the vehicle.

6. The fluid channeling device of claim 1 wherein the attachment means further comprises a flexible section for attachment to a member of the vehicle, the flexible section generally formed in a shape to facilitate attachment to the vehicle member.

7. The fluid channeling device of claim 1 wherein the fluid bearing system is an oil system, and the at least one of the inlet and outlet enables fluid flow through an oil filter inlet, where the fluid channeling device is placed in proximity to the at least one of the inlet and outlet to receive oil flowing therefrom.

8. The fluid channeling device of claim 1 wherein the fluid bearing system is a transmission system, and the at least one of the inlet and outlet enables fluid flow through a transmission filter, where the fluid channeling device is placed in proximity to the at least one of the inlet and outlet to receive transmission fluid flowing therefrom.

9. The fluid channeling device of claim 1 wherein the fluid bearing system is a hydraulic system, and the at least one of the inlet and outlet enables fluid flow through a hydraulic filter, where the fluid channeling device is placed in proximity to the outlet to receive hydraulic flowing therefrom.

10. The fluid channeling device of claim 1 further comprising a hose connected to the other, open end of the throat, the hose further channeling fluid from the engine lubrication system.

11. A fluid channeling device for facilitating changing motor oil in a motor vehicle having a lubrication system including an oil filter, where oil is supplied to the oil filter by an inlet passage and oil exits the oil filter from an outlet passage, comprising:

a mouth formed in a shape of a generally closed surface having open upper and lower ends and disposed in proximity to the inlet and outlet passages of the oil filter to collect fluid flowing from the inlet and outlet passages, and the mouth includes a side wall adapted to curve about a portion of the filter to enable connection of the filter to the vehicle and said upper end is adapted to extend outwardly from the vehicle along the length of the filter;

a throat connected beneath the open, lower end of the mouth, the throat having open ends providing fluid passage from the mouth through the throat; and attachment means for securing the fluid channeling device to the vehicle in proximity to the at least one of the inlet and outlet passages.

12. The fluid channeling device of claim 11 wherein the attachment means further comprises:

an aperture formed in the attachment means; and a fastener inserted through the aperture to attach to a portion of the vehicle to secure the fluid channeling device to the vehicle.

13. The fluid channeling device of claim 11 wherein the attachment means has clamping means which attaches to a portion of the vehicle, the clamping means facilitating attachment and detachment of the fluid channeling device to the vehicle to enable temporary installation on the vehicle.

14. The fluid channeling device of claim 11 wherein the attachment means further comprises:

an open cylindrical section for encircling a section of the engine and having two open ends;

the first end of the open cylindrical section having a plurality of serrations; and the second end of the open cylindrical section having a locking mechanism, where the first end is inserted into the locking mechanism, and the locking mechanism engages the serration;

wherein the first end may be variably inserted into the second end to vary a diameter of the open cylindrical section.

15. The fluid channeling device of claim 11 wherein the lubrication system includes an oil cooler having inlet and outlet passages, and the oil filter attaches to the oil cooler so that the oil cooler inlet passages supplies oil to the oil filter and the outlet passages receive oil exiting the oil filter, and the fluid channeling device includes an elongated section below the oil cooler so that the mouth is positioned below the oil cooler inlet and outlet passages.

16. A method for changing fluid of a fluid system in a vehicle, where the fluid system includes a fluid reservoir having a drain plug and a fluid filter which receives fluid from an inlet passage and returns fluid to an outlet passage, comprising the steps of:

positioning the vehicle to enable access to the drain plug and fluid filter;

removing the drain plug from the fluid reservoir to drain the fluid reservoir;

attaching a fluid channeling device to the vehicle in proximity to the inlet and outlet passages so that upon removal of the filter, the fluid channeling device collects substantially all fluid flowing from the passages;

replacing the filter; and removing the fluid channeling device.

17. The method of claim 16 wherein the fluid system is an engine lubrication system.

18. The method of claim 16 further comprising the steps of:

replacing the drain plug; and replacing the drained fluid with fresh fluid.

* * * * *